United States Patent

Bryson

[11] Patent Number: 5,974,667
[45] Date of Patent: Nov. 2, 1999

[54] FRICTION SLIDE RAIL ASSEMBLY WITH OVERMOLD BEARING SHELL

[75] Inventor: Robert Carl Bryson, Riverside, Calif.

[73] Assignee: Jonathan Manufacturing Corp., Fullerton, Calif.

[21] Appl. No.: 08/976,529

[22] Filed: Nov. 21, 1997

Related U.S. Application Data

[62] Division of application No. 08/832,471, Apr. 2, 1997, Pat. No. 5,890,811.

[51] Int. Cl.[6] .................................................. B23P 15/00
[52] U.S. Cl. ...................... 29/898.03; 384/42; 29/527.2; 29/458; 29/434
[58] Field of Search .............................. 29/898.03, 527.3, 29/458, 434, 527.2; 264/154; 384/7, 21, 20, 18, 19, 43, 42, 23, 34

[56] References Cited

U.S. PATENT DOCUMENTS

| | | | |
|---|---|---|---|
| 2,835,539 | 5/1958 | Conrad | 308/3 |
| 3,054,645 | 9/1962 | Evans | 308/3 |
| 3,119,644 | 1/1964 | Workman | 312/346 |
| 3,320,003 | 5/1967 | Edelson et al. | 308/3.6 |
| 3,649,090 | 3/1972 | Dutot | 308/36 |
| 3,848,937 | 11/1974 | Harder, Jr. | 308/6 R |
| 3,927,918 | 12/1975 | Dobbratz | 308/3.6 |
| 3,937,531 | 2/1976 | Hagen et al. | 308/3.8 |
| 3,985,403 | 10/1976 | Gallinato-Contino | 308/3.6 |
| 4,114,945 | 9/1978 | Lutz | 296/137 E |
| 4,236,773 | 12/1980 | Mertes | 312/341 R |
| 4,412,703 | 11/1983 | Simonson | 308/3.6 |
| 4,440,095 | 4/1984 | Mathieu | 105/225 |
| 4,516,811 | 5/1985 | Akiyama et al. | |
| 4,712,927 | 12/1987 | Arrendiell et al. | 384/23 |
| 4,941,758 | 7/1990 | Osawa | 384/40 |
| 4,998,828 | 3/1991 | Hobbs | 384/18 |
| 5,002,402 | 3/1991 | Parvin | 384/21 |
| 5,011,242 | 4/1991 | Cosme | 312/344.1 |
| 5,033,805 | 7/1991 | Hobbs | 312/339 |
| 5,049,341 | 9/1991 | Rubinstein | 264/242 |
| 5,085,523 | 2/1992 | Hobbs | 384/21 |
| 5,118,204 | 6/1992 | Peters | 384/42 |
| 5,200,014 | 4/1993 | Peters | 156/293 |
| 5,267,796 | 12/1993 | Nonaka et al. | 384/8 |
| 5,403,097 | 4/1995 | Woof | 384/20 |
| 5,419,639 | 5/1995 | Hobbs et al. | 384/18 |
| 5,484,197 | 1/1996 | Hansen et al. | 312/334.12 |
| 5,660,777 | 8/1997 | Herrmann et al. | 264/154 |
| 5,671,988 | 9/1997 | O'Neill | 312/334.44 |

*Primary Examiner*—David P. Bryant
*Assistant Examiner*—Marc W. Butler
*Attorney, Agent, or Firm*—Knobbe, Martens, Olson & Bear, LLP

[57] ABSTRACT

A slide assembly is provided including a first slide segment, a reinforcing member and an overmold shell. The first slide segment defines a first sliding surface and a second sliding surfaces. The overmold shell is molded around at least a portion of the reinforcing member to form a second slide segment with a first sliding surface and a second sliding surface. The first slide segment and the second slide segment positioned such that the first sliding surface of the second slide segment is slidable along the first sliding surface of the first slide segment and the second sliding surface of the second slide segment slidable along the second sliding surface of the first slide segment to control the sliding of the first slide segment and the second slide segment relative to one another.

5 Claims, 4 Drawing Sheets

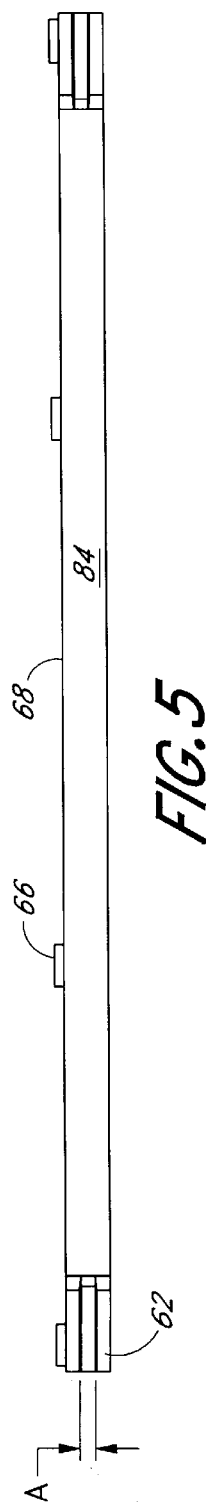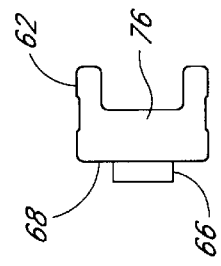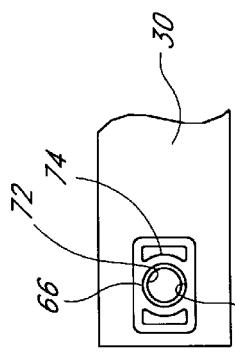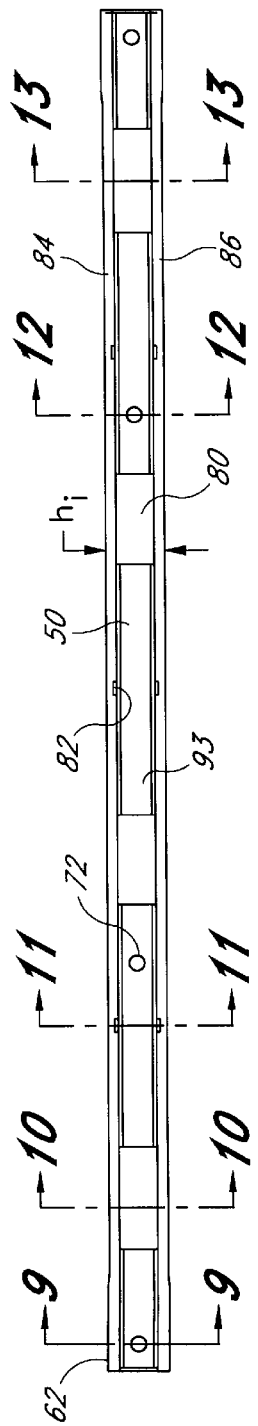

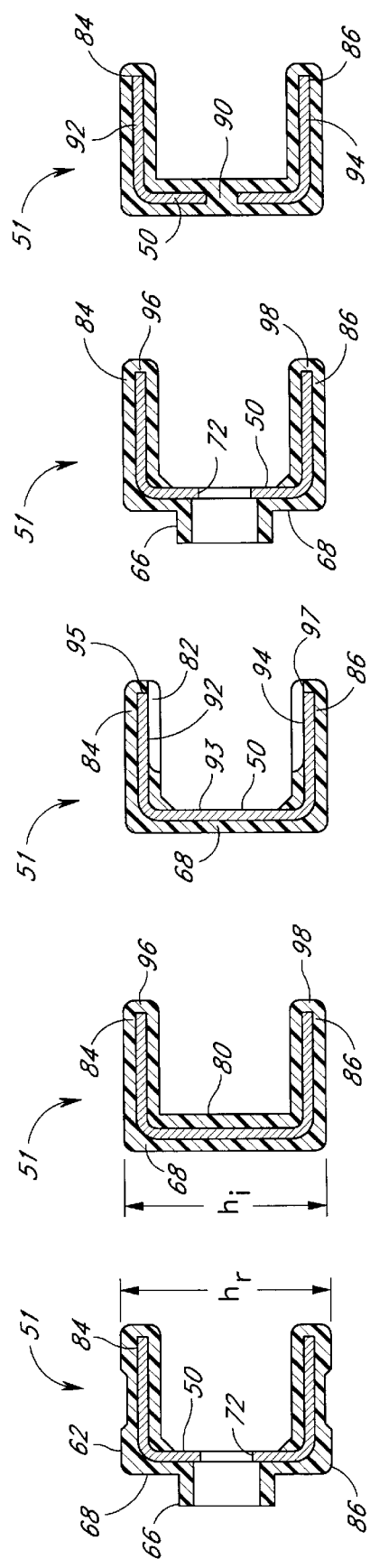

FRICTION SLIDE RAIL ASSEMBLY WITH OVERMOLD BEARING SHELL

This application is a divisional of U.S. patent application Ser. No. 08/832,471, filed Apr. 2, 1997, now U.S. Pat. No. 5,890,811.

BACKGROUND OF THE INVENTION

1. Field of the Invention

This invention relates to the field of slide mechanisms and, in particular, to friction slide mechanisms.

2. Description of the Related Art

Various available slide assemblies are used for mounting drawers and other loads to provide ease of longitudinal motion of the load in a generally horizontal plane. The primary performance criteria for slides is the amount of vertical and horizontal play, the consistency of the force and the maximum force required to operate the slide, strength and durability. The other major consideration is cost.

While some low end slides are manufactured from plastic, strength and durability requirements typically necessitate that the slide segments or rails be manufactured from metal.

There are three standard types of slide assemblies: a ball bearing slide; a roller slide; and a friction slide. A ball bearing slide utilizes slide segments or rails separated by ball bearings which are maintained in alignment by ball retainers and bridges. In most environments, the ball bearing slide provides for the smoothest travel, although at the greatest cost. The roller slide utilizes a pair of segments, each of which includes a roller and a track for receiving a roller from the mating slide segment. While not as smooth or as durable as the ball bearing slide mechanism, the roller slide is less expensive than the ball bearing slide. The friction slide is the least expensive but least smooth of the slide mechanisms, and generally comprises two slide segments or rails which slide directly against one another. Undesirably, this arrangement results in jerky movement and substantial wear on the slide mechanism. While efforts have been made to overcome this drawback by spraying a carbon coating on the mating slide segments, the carbon coating tends to quickly wear off and pieces of the carbon coating tend to flake off and into the working environment of the slide. Typically, the carbon coating will have a thickness of no more than about 0.002 inches. While the quality slides are occasionally manufactured from plastic, plastic provides insufficient strength to support all but the lightest load.

In certain working environments, such as a slide for a table saw, a very smooth and precise slide mechanism may be desired, yet a constant presence of sawdust tends to interfere With the working of the slide mechanism. Accordingly, there is a need for an improved slide mechanism which overcomes the drawbacks of the prior art, preferably at a relatively low cost.

SUMMARY OF THE INVENTION

The invention provides an improved slide assembly and method of manufacturing the same. Specifically, the assembly is particularly adapted to provide a slide assembly with a low amount of vertical and horizontal play, with consistent and low maximum force operating requirements. Advantageously, the assembly also lends itself to durability and low cost manufacture.

One aspect of the invention is a slide assembly including a first slide segment, a reinforcing member and an overmold shell. The first slide segment defines a first sliding surface and a second sliding surfaces. The overmold shell is molded around at least a portion of the reinforcing member to form a second slide segment with a first sliding surface and a second sliding surface. The first slide segment and the second slide segment positioned such that the first sliding surface of the second slide segment is slidable along the first sliding surface of the first slide segment and the second sliding surface of the second slide segment slidable along the second sliding surface of the first slide segment to control the sliding of the first slide segment and the second slide segment relative to one another.

Desirably, the first slide segment further includes a third sliding surface and a fourth sliding surface, and the second slide segment further includes a third sliding surface and a fourth sliding surface. The segments are positioned such that the third sliding surface of the first slide segment is slidable along the third sliding surface of the second slide segment and the fourth sliding surface of the first slide segment is slidable along the fourth sliding surface of the second slide segment, thereby limiting movement of the first segment and the second segment relative to one another. It is likewise advantageous for the first slide segment and the second slide segment to each comprise a single unit, and the second slide segment is positioned substantially within the first slide unit.

Another aspect of the invention is a slide assembly including a first slide segment and a second slide segment. The a first slide segment defines a first sliding surface and a second sliding surface. The second slide segment includes a reinforcing member and a shell integral with the reinforcing member and defines a first sliding surface and a second sliding surface . The shell comprises a plastic material. The first slide segment and the second slide segment positioned such that the first sliding surface of the second slide segment is slidable along the first sliding surface of the first slide segment and the second sliding surface of the second slide segment slidable along the second sliding surface of the first slide segment to control the sliding of the first slide segment and the second slide segment relative to one another. For durability and coverage purposes, the shell desirably has a thickness of roughly six-hundredths of an inch. The shell desirably comprises a plastic having a high lubricity, and preferably comprises a form of nylon.

Another important aspect of the invention is a method of making a slide assembly, including: (1) forming a first slide segment with a first sliding surface and a second sliding surface; (2) forming a reinforcing member; (3) molding a shell over at least a portion of the reinforcing member to form a second slide segment with a first sliding surface and a second sliding surface; and (4) positioning one of the slide segments relative the other such that the first sliding surface of the second sliding segment slides along the first sliding surface of the first slide segment and the second sliding surface of the second sliding segment slides along the second sliding surface of the first slide segment to control the sliding of the first slide segment and the second slide segment relative to one another. Advantageously, the forming of the first slide segment further comprises forming a first slide segment with a third sliding surface and a fourth sliding surface, and the molding step further comprises forming a second slide segment with a third sliding surface and a fourth sliding surface, and wherein upon the insertion of one of the slide segments substantially within the other, the third sliding surface of the first slide segment slides along the third sliding surface of the second slide segment and the fourth sliding surface of the first slide segment slides along the fourth sliding surface of the second sliding segment.

The method desirably includes molding the shell in a manner such that the second slide segment defines a series of raised spacing projections which define mounting apertures.

Further advantages and applications will become apparent to those skilled in the art from the following detailed description of the preferred embodiments and the drawings referenced herein, the invention not being limited to any particular embodiment.

BRIEF DESCRIPTION OF THE DRAWINGS

FIG. 5 shows a top view of a preferred embodiment of an inner rail;

FIG. 6 shows an enlarged view of a spacer from the rail of FIG. 5;

FIG. 7 shows an end elevational view of the inner rail of FIG. 5;

FIG. 8 shows a front elevational view of the inner rail of FIG. 5;

FIG. 9 shows a cross-sectional view taken along 9—9 of FIG. 8;

FIG. 10 shows a cross-sectional view taken along 10—10 of FIG. 8;

FIG. 11 shows a cross-sectional view taken along 11—11 of FIG. 8;

FIG. 12 shows a cross-sectional view taken along 12—12 of FIG. 8; and

FIG. 13 shows a cross-sectional view taken along 13—13 of FIG. 8.

DETAILED DESCRIPTION OF THE PREFERRED EMBODIMENT

Figure 1:
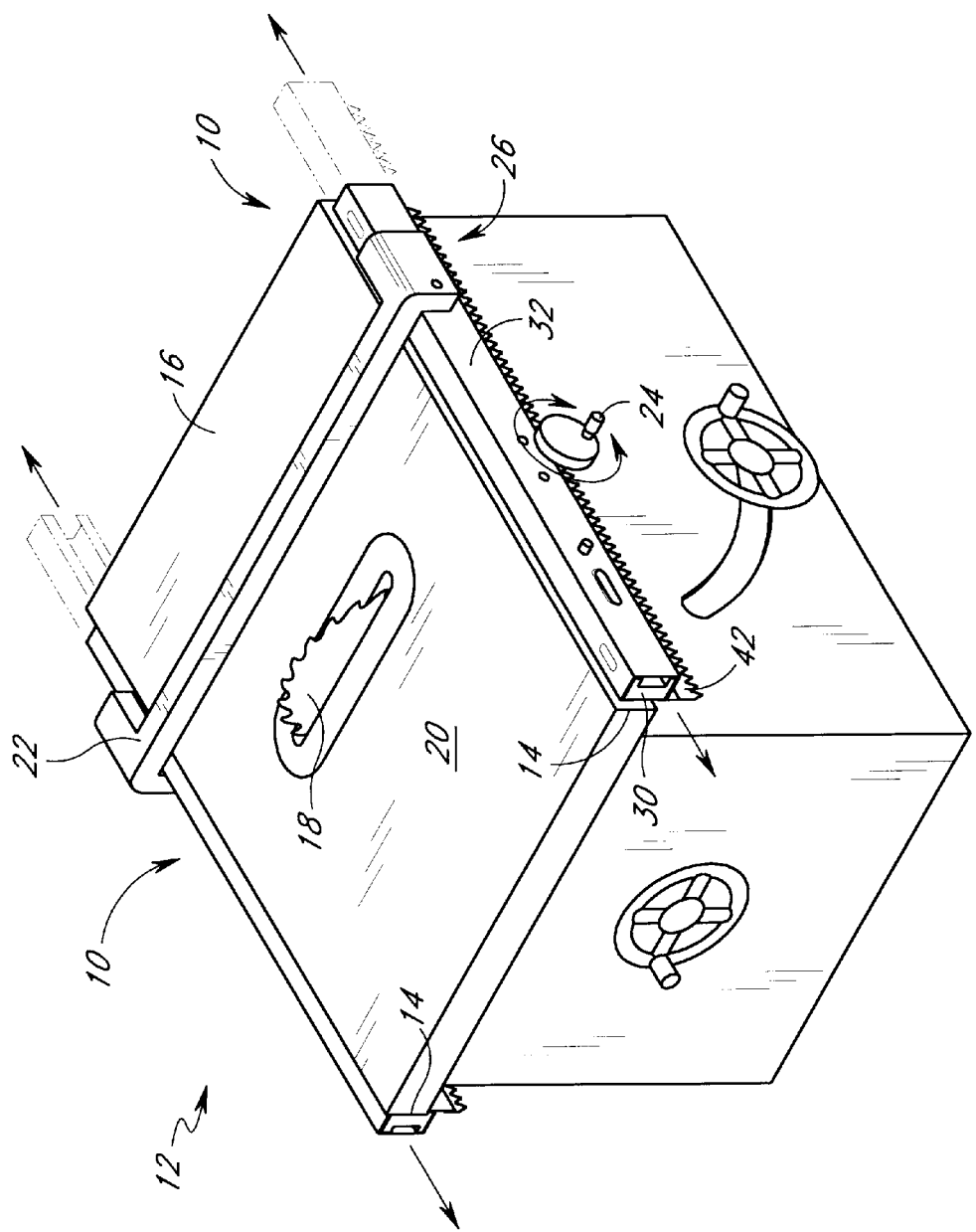
FIG. 1 shows a perspective view of a table saw with a pair of slide rail assemblies in accordance with a preferred embodiment of the present invention.

For illustrative purposes, the slide assembly of the present invention will be deserted in accordance with a preferred embodiment for use in connection with a table saw. Specifically, FIG. 1 illustrates a preferred embodiment of a pair of slide rail assemblies 10 as parts of a table saw 12. The assemblies 10 are attached to ends 14 of a table 16 transverse to a saw blade 18 extending through the table top 20. A base portion housing the motor for the saw (not shows) extends below the table top. A fence 22 is used to position a piece of wood being cut and also to couple the translation of the two assemblies 10 along their lengths. Preferably, at least one spring-loaded handwheel 24 is provided at the attachment of the fence 22 to one of the assemblies 10. The handwheel 24 is used to drive the motion of the assemblies 10 along a rack and pinion system 26 provided below each of the slide rail assemblies 10 and extending across the underside of the table top 20. Indicia are preferably provided along the edges of the tables to indicate the travel by the assemblies as the handwheel is cranked by an operator.

Although the present invention is described herein with reference to a preferred embodiment as, part of a table saw 12, which is believed to have numerous unique advantages, changes or modifications may be desirable in other applications.

Figure 2:
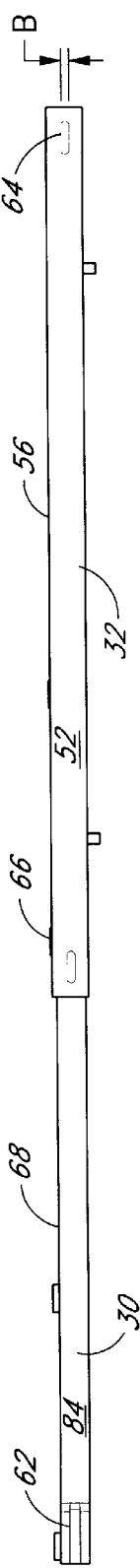
FIG. 2 shows a top view of the right slide rail assembly of FIG. 1 in an open position.
Figure 3:
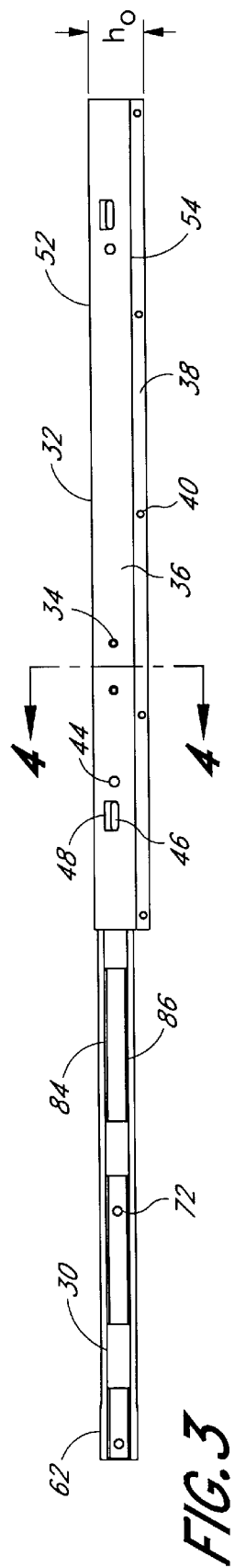
FIG. 3 shows a right elevational vied of the slide rail assembly of FIG. 2.
Figure 4:
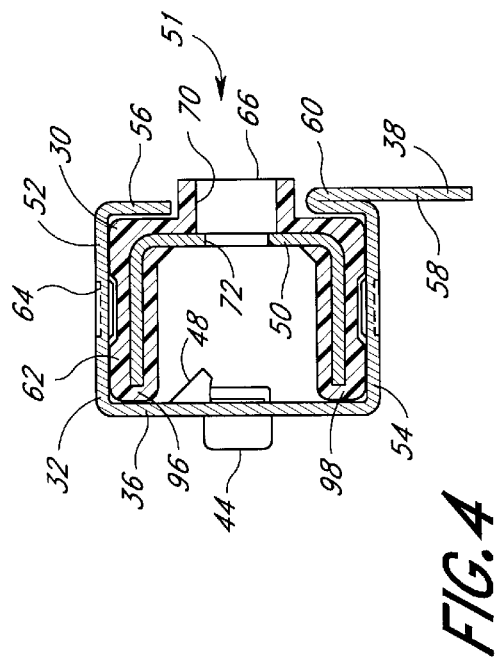
FIG. 4 shows a cross-sectional view taken along 4—4 of FIG. 3.

FIGS. 2–4 show inner and outer slide rails 30,32 or channels comprising each assembly 10. The inner rail 30 is secured to a fixed member, such as the table 16 in the example of FIG. 1. The outer rail 32 is slidably movable over the inner rail 30, along its longitudinal axis. In use, the screws (not shown) used to fasten the slide rail assembly 10 to the table 16 or such are inserted through apertures 70,72 such that the screw heads are positioned within the inner rail 30, between the upper and lower walls 84,86. Details of the operation of the assembly 10 are provided below. It is understood that the present invention can also be used in applications requiring more or less slide rail assemblies. Also, the slide rail assembly may be provided with additional or other attachment features of the inner and/or outer rail, as desired, without loss of the benefits of the present invention.

Generally, the inner and outer rails 30, 32 comprise elongated channels sized for close fit therebetween. As shown in the cross-section of FIG. 4, the outer rail 32 is substantially C-shaped with upper and lower walls 52, 54, a front wall 36 and a divided rear portion 56, 58. The opening between the upper and lower rear walls sections 56, 58 allows bosses 66 of the inner rail 30 to protrude for attachment to the table 16. The lower rear wall section 58 includes a portion 38 extending below the outer rail's lower wall 54 for attachment of the rack gear 42 as described below.

The inner rail 30 is substantially a sideways U-shape or C-shape, including an upper leg 84, a lower leg 86 and a connecting leg 68. The inner rail is formed by overmold bearing shell and an inner reinforcing member or channel 50. Specifically, the shell is plastic, and, more particularly, a lubricous thermoplastic, and the channel 50 is a steel channel having upper and lower arms 92, 94 (having a free ends 95 and 97, respectively) and a connecting member 93. The steel channel arms 92, 94 are formed at substantially right angles to the connecting member 93. Bases 66 extend from the connecting member 93 in a direction opposite the channel arms 92, 94.

The plastic advantageously provides the smooth sliding or bearing surface between i) the outer surface of the upper wall 84 of the inner rail 30 and the inner surface of the upper wall 52 of the outer rail 32; ii) the outer surface of the lower wall 86 of the inner rail 30 and the inner surface of the lower wall 54 of the outer rail 32; iii) the forward edges 96, 98 of the upper and lower walls 84, 86 of the inner rail 30 and the inner surface of the front wall 36 of the outer rail 32; and iv) the outer surface of the rear wall 68 and bosses 66 of the inner rail 30 and the inner surface of the rear wall sections 56, 58 of the outer rail 32.

As shown in FIG. 4, close mating of the inner dimensions of the outer rail 32 with the outer dimensions of the inner rail 30 are achieved. One important factor in the improved, smooth motion between the inner and outer rails is the forming of the plastic shell 51 directly onto the steel channel 50. Portions of the steel channel 50 are left exposed, or without the plastic shell 51 formed thereover, for economy in the amount of plastic necessary to provide the bearing shell and for facilitating manufacturing, as discussed below.

Outer Slide Rail

Referring to FIGS. 3 and 4, holes 34, which may be tapped, are provided on a front wall 36 of the outer rail 32 for attachment of other work accessories, as desired. Similarly, a depending portion 38 of the outer rail 32 may include one or several holes 40 for attachment of additional equipment, such as the rack gear 42 shown in FIG. 1. As shown more clearly in FIG. 4, a locating pin 44 is provided near each end of the outer rail 32 for use with the fence 22, so that the fence can be attached near either end. An aperture 46 with an upper edge 48 pressed inwardly is provided adjacent each pin 44 to hold the fence 22 which clips onto the outer rail 32.

The outer rail 32 is preferably roll formed to close tolerances. The outer rail material is preferably steel, and more preferably is 0.060" thick with chrome plating. In one aspect, a close-fit is achievable between the inner and outer rails 30,32, as shown in the figure, by maintaining only the inner dimension of the outer rail to strict requirements, thus obtaining an important advantage of the present invention.

In one particularly preferred embodiment, the outer rail length is about 26.496" and its total height $h_o$ is about 1.753". The upper and lower walls 52,54 of the outer rail 32 are preferably about 1.0051" and 1.008" wide, respectively. The front wall height is about 1.321", and an upper rear wall 56 is about 0.354". A lower rear wall 58 including the depending portion 38 is about 0.767", including an extension of about 0.432" by the depending portion. A thickness of a folded lower rear wall 60 of the outer rail 32 is about 0.125".

Inner Slide Rail

Referring now in detail to FIG. 5, a top plan view of a preferred embodiment of the inner rail 30 having the bearing shell 51 molded over the channel 50 is shown. The plastic shell 51 preferably extends around the majority of the steel channel 50. Preferably, an internally lubricated thermoplastic is used which has suitable performance characteristics, such as adhesion to the zinc coated steel and long wear. More preferably, a lubricated nylon 6/6 composite is used, and, even more preferably, Lubriloy (TM) from the Lubricomp (R) series available from LNP Engineering Plastics, Inc. of Exton, Pa. is used.

A raised portion of the shell 51 comprising a pair of ramps 62 is formed on a top and bottom of the rail 30 at each end. This raised portion 62 is preferably limited to about 1–3" in length. The ramps 62 are spaced apart by a distance A approximately the same as the width B of indentations 64 at each end of the top wall 52 of the outer rail 32 (FIG. 2). The indentations 64 and ramps 62 cause increased frictional contact between the inner and outer rails 30,32 as the two components become longitudinally aligned. In alternative embodiments, the ramps 62 and indentations 64 could be modified in their shapes, and the indentations 64 of the outer rail 32 could be omitted. The raised portion could also extend several inches, although in the example shown it is preferred that the total lengths of the raised portions not exceed about 20% of the length of the inner rail.

As shown in FIG. 5, a plurality of bosses 66 or spacers extend from a rear 68 of the inner slide rail 30 as part of the shell 51. There are preferably four bosses 66 spaced along the length of the rail 30, including bosses at the ends of the rail. As shown in FIGS. 6 and 9, apertures 70,72 are provided through the bosses 66 and steel channel 50 to receive screws (not shown) for fastening the inner rail 30 to the table 16 or other such member. These bosses 66 aid in isolating the slide rail assembly 10 from vibrations on the table 16.

FIG. 6 shows an elevational view of one boss 66 located at an end of the inner rail 30. The diameter of the aperture 70 in the plastic boss 66 is slightly larger than the diameter of the aperture 72 of the steel channel 50. In the plastic overmolding technique used in forming the inner rail 30, the boss 66 is preferably formed having a rectangular outer shape with side openings 74 provided about the aperture 70. The side openings 74 also expose the zinc plated steel channel 50. The exposed sections of the steel channel 50 facilitate the clamping of the inner rail 30 during the plastic overmolding process, as described below.

The channel 50 is preferably cold rolled, zinc plated steel and has the bearing shell 51 formed directly thereon. Preferably, the steel channel 50 comprises steel of about 0.060" thickness. The cold rolling process will provide tolerance within a given tolerance in straightness over the length of the rail 30. Advantageously, the plastic overmolding technique, or insert molding, can compensate to some extent for imprecision in the forming of the channel 50 by controlling the outer dimensions of the inner rail 30.

Apertures 72 in the steel channel 50 corresponding to the bosses 66 are preferably punched and are about 0.297" in diameter. Additional holes 90 corresponding to the location of the bridges 80 are formed and generally much smaller than the apertures 72. It has been found that providing holes 90 in the steel channel 50 expedites the flow of the thermoplastic material during the overmolding process. The four holes 90 in the steel channel 50 are preferably about 0.135" in diameter. The steel channel 50 is preferably coated with any commercially available black zinc material prior to the plastic overmolding procedure. Other suitable materials and colors may be used for the steel channel 50 without loss of advantage in the present invention.

An end view of the inner rail 30 is shown in FIG. 7 and illustrates the web of plastic 76 that is used to cap the ends. The webs 76 serve to ensure that the ends of the steel channel 50 are covered by plastic after it has cooled and shrunk to a close fit over the steel. The webs 76 are also more aesthetically appealing than the thinner shape of the inner rail 30 between the ends.

Referring now to FIGS. 8–13, shown are a front and various cross-sectional views of the inner rail 30 comprising a steel channel 50 with overmold bearing shell 51. In particular, the front view of the inner rail 30 shows the exposed sections of the zinc plated steel channel 50 along with plastic covered sections or bridges 80. Notches 82 on the inner sides of the upper and lower walls 84,86 of the inner rail 30 also expose the steel channel 50.

FIG. 9 shows a cross-section of the inner rail 30 with the boss 66 integrally formed by the plastic. FIG. 10 shows the complete enclosure of the steel channel 50 by the plastic at the bridge sections 80 of the inner rail 30. FIG. 11 shows the exposure of the steel channel 50 on the front side of the rear wall 68 and at the notches 82 of the inner rail. FIG. 12 corresponds to the view of FIG. 9, without the ramps 62. FIG. 13 shows a cross-section taken at about the center of the bridge 80, where a small hole 90 is provided in the steel channel 50.

In the particularly preferred embodiment, the inner rail 30 has a length of about 26.496", with the coated steel channel 50 having a length of about 26.279". The channel 50 preferably has a height of about 1.000", with upper and lower arms 92,94 extending about 0.713". The widths of the upper and lower walls 84,86 of the molded inner rail 30 is about 0.854". The web 76 at the ends of the inner rail 30 are preferably about 0.460" wide. The bosses 66 preferably extend about 0.182" from the rear wall 68. The height $h_i$ of the inner rail 30 without the ramps 62 is about 1.143". The height $h_r$ at the raised ends of the inner rail 30 is preferably about 1.190".

Overmold Bearing Shell of the Inner Rail

The techniques for plastic overmolding are known in the art, and a preferred method is described below for providing the overmold bearing shell 51 of the inner rail 30 in the slide rail assembly 10 of the present invention. It should first be noted that overmolding is commonly used to join separate components without the need for separate fasteners, as described in co-pending U.S. application Ser. No. 08/832, 471, filed Apr. 2, 1997, now U.S. Pat. No. 5,890,811, titled "TWO-WAY EXTENDED TRAVEL SLIDE SUSPENSION" which is commonly assigned to Jonathan Manufacturing Co. of Fullerton, Calif. and is hereby incorporated by reference in its entirety. In the present application, the overmolding technique is used to provide a hybrid or combination plastic-steel component which replaces two separate, mating elements. This novel hybrid has desirable performance characteristics from the individual components, i.e., the stiffness of the steel and the lubricous bearing surface of the thermoplastic, and the additional advantage of reducing the multiple tolerancing requirements of the slide rail assembly.

The overmolding technique has many advantages over other structural approaches, such as the use of a non-integral plastic rail intermediate the inner and outer steel rails. Specifically, the attachment of such a rail increases the opportunity for misalignment or slop with respect to the tight tolerances required for smooth sliding between the inner and outer rails, since tolerancing of the hole diameters and outer dimensions of the spacers are additionally required.

In the present invention, the overmold bearing shell 51 that is formed on the steel channel 50 to form the inner rail 30 advantageously reduces the difficulties. The thermoplastic is molded directly onto the steel channel 50 to form the inner rail 30, and the bosses 66 and apertures 70 are integrally formed onto the rear wall 68 of the inner rail 30.

Thus, in another aspect, the direct molding of the plastic shell 51 onto the steel channel 50 to form the hybrid component 30 reduces the tolerancing requirements. While the steel channel 50 should still be manufactured to relatively strict requirements, only the outer dimension of the molded inner rail 30 must be controlled for proper fit with the outer rail 32. Since a mold is used in the process, once the mold has been ated to the precise dimensions, its dimensions are fixed and much improved control over the tolerances of the molded inner rail 30 are achieved during manufacturing.

In addition, the preferred material of an internally lubricated thermoplastic, more preferably a lubricated nylon 6/6 composite, is used in the mold and provides predictable tolerances in the plastic shell 51 after cooling. This material also has self-lubricating qualities that are desirable for smooth operation of the slide rail assembly 10.

Plastic Overmolding

The preferred method of production of the molded inner rail 30 will now be described. First, the steel member 50 forming the core of the inner rail 30 is cold rolled to substantially a C-shape (or sideways U-shape), preferably maintaining close tolerances on the straightness along its length. This roll forming technique is preferred because of the capability to economically provide the required tolerances in a higher volume manufacturing environment. It is undesirable to have curvature in any direction, such as bow or camber, which can degrade smooth sliding of the assembly components.

After preparation of the channel 50, with holes 72, 90, a two-piece mold (not shown) is preferably attached over the front and rear halves of the inner rail 30. References to front, rear, top and bottom will be used below as previously defined, although, it is understood that the process is not limited to execution strictly in these directions, such that the mold may be attached, for example, to top and bottom portions of a U-shaped channel. The mold is clamped to the steel channel 50 at the rear around the apertures 72, where the bosses 66 are formed. The mold is held and centered at the apertures 72 by contacting the rear rim of the apertures 72 and at side locations which form the side openings 74 of the boss. The mold contacts the steel channel 50 at the front adjacent the bridges 80.

A plurality of injection points or gates for the heated, internally lubricated thermoplastic are positioned at the rear of the mold. It has been found that for the preferred embodiment described at least four gates are required to allow the plastic to flow to the entire length of the steel channel 50 before cooling occurs. The bridges 80 are formed as a result of a mold channel used to expdite the flow of plastic to the inner sides of the walls 84, 86.

During initial attempts at this plastic overmolding of the steel channel 50, it was found that the cooling thermoplastic material would deform or bend the inner rail 30 from the substantially right angles of the walls 84,86 to more acute angles with respect to the middle or rear wall 68. The placement of three blocks along the length of the steel channel 50, between the upper and lower arms 92,94 and toward the front edges, was found to sufficiently maintain the shape of the inner rail 30 as the plastic cooled. The spaced blocks form the notches 82 shown in FIG. 8.

In this preferred embodiment, after cooling, the thickness of the plastic molded over the steel channel 50 is preferably about 0.070" on the rear wall 68 and on the upper and lower walls 84,86, including the front ends 96,98 of the upper and lower walls. Preferably, the plastic thickness is about 0.079" at the bridges 80. The bridges preferably extend about 1.748" along the length of the inner rail 30. The apertures 70 of the bosses 66 are about 0.378" in diameter. It is preferred that the plastic mold incorporated rounded exterior corners and chamfered interior corners at about 45°. The notches 82 measure about 0.283" by 0.512".

Operation

Referring back to FIG. 1, a pair of the present slide rail assemblies 10 in the preferred construction are shown in a closed position as used with a saw table 16. FIGS. 2 and 3 show the assembly 10 in an open position. As indicated in FIG. 4, the closest tolerances are achieved between the lubricous molded inner rail 30 and the outer rail 32 at the ends of the inner rail 30. In the closed position, the ends of the inner rail are in a closer fit with the ends of the outer rail 32 due to the ramps 62. In the example shown, it is preferred to limit the higher coefficient of friction to the ends since in use the end closest to the load on the table 16 is a primary bearing surface.

In use, the outer rail 32 would require slightly more force to slide it over the inner rail 30 from the closed position. As the inner surfaces of the ends of the outer rail 32 lose contact with the outer surfaces of the ramps 62 on the ends of the inner rail 30, the force required to slide the assembly is lessened.

In the open position, where the outer rail 32 is slid over one end of the inner rail 30, the fence 22 is attached near the corresponding end on the outer rail 32. The piece of wood to be cut is positioned adjacent the fence 22 and toward the saw blade 18. Thus, the weight of the wood and pressure by the operator in holding the wood will apply a force acting on the slide assembly 10 at about the end of the inner rail 30. Thus, while thicker plastic could be uniformly molded onto the steel channel 50 to form the inner rail 30, providing the ramps 62 affords economy in the amount of plastic and further reduces the strict tolerancing requirements.

In addition, limiting the thickest portions of the inner rail 30 to the ends makes it easier to position the slide rail assembly 10 for use. And, as the inner and outer rails become aligned to the closed position, the increased frictional force provides feedback to the operator and facilitates this alignment.

The embodiments described above are provided merely to illustrate the present invention. Changes and modifications may be made from the embodiments presented herein by those skilled in the art without departure from the spirit and scope of the invention, as defined by the appended claims.

What is claimed is:

1. A method of making a slide assembly, comprising:

rolling a sheet of metal into a C-shaped channel comprising a first arm having an inner surface, an outer surface and a free end and a second arm having an inner surface, an outer surface and a free end, and a connecting member having an inner surface and an outer surface;

molding a plastic shell over at least a portion of said channel, so that said shell covers substantially all of said outer surface of said first arm, substantially all of said free end of said first arm, substantially all of said outer surface of said connecting member, substantially all of said outer surface of said second arm and substantially all of said free end of said second arm, thereby forming an inner rail from said C-shaped channel and said plastic shell;

forming an outer rail having a first pair of opposing walls and a second pair of opposing walls transverse to said first pair of opposing walls; and positioning said inner rail within said outer rail so that a portion of said plastic shell covering said first free end and a portion of said plastic shell covering said second free end contact one of said first pair of opposing walls, and a portion of said plastic shell covering said connecting member contacts another of said first pair of opposing walls, and at least one of a portion of said plastic shell covering said outer surface of said first arm and a portion of said plastic shell covering said second arm contacts at least one of said second pair of opposing walls.

2. The method of claim 1, further comprising molding said shell in a manner such that said second slide segment defines a series of raised spacing projections.

3. The method of claim 2, further comprising molding said shell in a manner such that said series of raised spacing projections define mounting apertures.

4. The method of claim 1, further comprising molding said shell so as to to substantially encase said first arm and said second arm of said channel.

5. The method of claim 1, further comprising forming said outer rail as a single piece.

* * * * *